United States Patent [19]
Shen et al.

[11] Patent Number: 5,917,290
[45] Date of Patent: Jun. 29, 1999

[54] PARALLEL-STORAGE SERIES-DRIVE ELECTRONIC BALLAST

[75] Inventors: Eric Bertrand Shen, Scarborough, N.Y.; Martin Frederick Schlecht, Lexington, Mass.

[73] Assignee: Massachusetts Institute of Technology, Cambridge, Mass.

[21] Appl. No.: 08/964,102

[22] Filed: Nov. 6, 1997

[51] Int. Cl.[6] .................................................. H05B 37/02
[52] U.S. Cl. ..................... 315/209 R; 315/247; 315/275; 315/291; 315/DIG. 5
[58] Field of Search .......................... 315/209 R, DIG. 5, 315/307, DIG. 4, 291, 244, 224, 308, 219, 310, 247, 275, DIG. 7

[56] References Cited

U.S. PATENT DOCUMENTS

| | | | |
|---|---|---|---|
| 5,416,387 | 5/1995 | Cuk et al. | 315/247 |
| 5,444,310 | 8/1995 | Kataoka et al. | 315/209 R |
| 5,652,480 | 7/1997 | Groiss | 315/219 |
| 5,789,871 | 8/1998 | Shen et al. | 315/291 |

OTHER PUBLICATIONS

"Principles of Power Electronics" by John G. Kassakian et al, pp. 268–269, Addison–Wesley Publishing Company, 1991.

*Primary Examiner*—Don Wong
*Assistant Examiner*—Wilson Lee
*Attorney, Agent, or Firm*—Robert J. Kraus

[57] ABSTRACT

An electronic ballast is provided for converting an AC voltage and current, supplied by a power source such as a power line, to an alternating square-wave voltage and current having the same frequency, for supply to a discharge lamp. The ballast includes at least one capacitor, bridge switches and high-frequency duty-cycle switches. The bridge switches and the high-frequency duty-cycle switches cooperate to successively electrically connect the capacitor in parallel with the power source, electrically connect the capacitor in series with the power source and the discharge lamp, and to regulate the current provided to and from the capacitor to drive the discharge lamp with a desired square-wave voltage and current at the line frequency.

58 Claims, 9 Drawing Sheets

PARALLEL-STORAGE SERIES-DRIVE ELECTRONIC BALLAST

BACKGROUND OF THE INVENTION

1. Field of the Invention

The invention relates to ballasts for lamps and, in particular, to electronic ballasts for discharge lamps.

2. Description of Related Art

It has been estimated that over 25% of all electrical energy consumed in the world is utilized to power artificial lighting. Thus, the importance of efficient electrical lighting sources cannot be understated.

The most efficient electrical lighting sources, that are commonly available, are gaseous low-pressure and high-pressure discharge lamps, e.g. fluorescent and high-intensity-discharge (HID) lamps, respectively. These types of lamps typically have a negative-resistance characteristic and are driven by current-limiting circuits known as ballasts.

Two general types of lamp ballasts, i.e. electromagnetic and electronic, are in common usage for driving discharge lamps. Electromagnetic ballasts have only passive circuit components and typically drive lamps at power-line frequencies. Electronic ballasts include both passive and active circuit components and typically drive lamps at frequencies much higher than power line frequencies. Generally, the electromagnetic ballast is less expensive. However, the electronic ballast is smaller and lighter, operates discharge lamps more efficiently, with less audible noise and with no visible flicker, and contributes to a longer lamp life. Additionally, electronic ballasts can regulate discharge-lamp power more effectively than electromagnetic ballasts in response to changing power-line and lamp-operating conditions.

FIG. 1 schematically illustrates a typical electronic ballast for driving a discharge lamp L from an AC voltage $v_{ac}$ provided by a power source PS, such as power lines from a local utility. The ballast includes an electromagnetic interference filter EMI, a full-wave rectifier bridge BR, a power-factor correction circuit, an energy-storage capacitor $C_e$, and a half-bridge resonant inverter, all electrically connected in series between the power source and the lamp L.

The filter EMI prevents electromagnetic interference generated by the ballast circuitry and the discharge lamp from being conducted back to the power source. The ballast generates EMI in the form of high harmonic currents which, if conducted back to the power source, could cause problems such as excessive neutral currents, overheated transformers, and interference with any sensitive electronic equipment which also receives electrical energy from the power source. Discharge lamps can generate both electromagnetic and radio-frequency interference.

The power-factor correction circuit is a well-known boost-converter type, including an inductor $L_{10}$, a switching transistor $Q_{10}$ and a diode $D_{10}$. It functions to increase the power factor at the AC power source and to boost the DC voltage provided to the energy-storage capacitor $C_e$ by the bridge BR.

The energy-storage capacitor $C_e$ performs two functions. First, it acts as a DC voltage source for the resonant inverter. Second, it balances the energy flow between the load and the power source. When the AC power source PS is instantaneously supplying less power than the load is consuming, $C_e$ must deliver energy to the load. Conversely, when the AC power source is instantaneously supplying more power than the load is consuming, $C_e$ must store energy.

The resonant inverter output stage converts the DC voltage on the energy storage capacitor $C_e$ to a high frequency sinusoidal drive for the lamp L. Two transistor switches $Q_{11}$ and $Q_{12}$ are electrically connected in a half-bridge configuration and operate at a 50% duty cycle to chop the DC voltage into a high-frequency square wave. A capacitor $C_b$ is provided for blocking DC components from reaching a transformer T, which is provided for both isolation and impedance matching. An inductor $L_f$ and a capacitor $C_f$ form a second-order filter for filtering the high-frequency square wave so that a sinusoidal voltage and current, at the fundamental switching frequency, are applied to the discharge lamp L.

SUMMARY OF THE INVENTION

It is an object of the invention to provide an electronic ballast which optimizes the drive current for a discharge lamp to improve the radiation efficiency of the lamp. For maximum radiation efficiency, a constant DC drive current would be supplied. This is not practical, because a power-dissipating ballast resistor would be required. Also, in fluorescent lamps this would cause a unidirectional migration of ions in the discharge column and the light produced at one end of the lamp would be brighter than at the other. The sinusoidal AC current supplied by the prior art ballast of FIG. 1 is a compromise. It periodically reverses the polarity of the drive current to achieve uniform brightness along the length of the discharge column, but the magnitude of the drive current is never constant.

It is another object of the invention to provide an electronic ballast which is compact and which does not contribute to electromagnetic interference production by a discharge lamp. In the prior art ballast of FIG. 1, the size of the passive filter components in the resonant inverter can be reduced by increasing the operating frequency. However, increasing the operating frequency of the discharge lamp also increases electromagnetic interference energy radiated by the lamp.

It is yet another object of the invention to reduce the size of the energy storage capacitor required for a lamp ballast. The electronic ballast of FIG. 1 supplies full-wave rectified sinusoidal power to the capacitor $C_e$ at twice the power source frequency. At this relatively low frequency, the power supplied to the capacitor is well below peak amplitude for relatively long intervals. In order to provide low-ripple power to the resonant inverter, the capacitor $C_e$ must be physically large.

It is still another object of the invention to provide an electronic ballast which does not require the use of a transformer. The transformer utilized in an electronic ballast such as that shown in FIG. 1 not only increases the size and weight of the ballast, it also contributes to electrical losses in the ballast.

It is a further object of the invention to provide an electronic ballast which takes advantage of improvements in semiconductor technology. The electronic ballasts which are commonly available to the lighting industry do not take full advantage of the efficiencies in size, power consumption and cost that are increasingly possible by utilizing state-of-the-art integrated circuit technology, particularly in the power semiconductor field.

In accordance with the invention, an electronic ballast is provided for converting an alternating voltage and current of predetermined waveform and frequency, supplied by a power source, to an alternating square-wave voltage and current of said frequency for supply to a discharge lamp. The ballast comprises at least one capacitive storage means, bridge switching means and high-frequency duty-cycle switching means. The bridge switching means and high-frequency duty-cycle switching means cooperate to periodically:

- electrically connect the at least one capacitive storage means in parallel with the power source;
- electrically connect the at least one capacitive storage means in series with the power source and the discharge lamp; and
- regulate the average current provided to and from the at least one capacitive storage means to effect production of said square-wave voltage and current.

The alternating square-wave DC drive voltage, and corresponding DC drive current, produced by the ballast maximizes radiation efficiency of the discharge lamp without the need for a power-dissipating resistor while avoiding the unidirectional ion migration that would occur in fluorescent lamps if driven with a unidirectional DC current.

By utilizing duty-cycle switching at a very high periodic rate while producing an alternating DC lamp driving voltage at a low frequency, the ballast can be made compact without increasing electromagnetic interference energy radiated by the lamp.

By providing a switching arrangement for intermittently connecting a storage capacitor in series with the power source and the discharge lamp, such that the storage capacitor combines with the power source in powering the lamp, rather than independently providing the full energy requirement of the lamp, the size of the storage capacitor may be much smaller than in prior art ballasts.

By producing the lamp drive power by utilizing the above described switching and capacitive storage means, the need for a cumbersome and lossy transformer is avoided.

Further, the switching means utilized in a ballast in accordance with the invention are especially suitable for construction with power integrated circuits.

DESCRIPTION OF THE PREFERRED EMBODIMENTS

Figure 1:
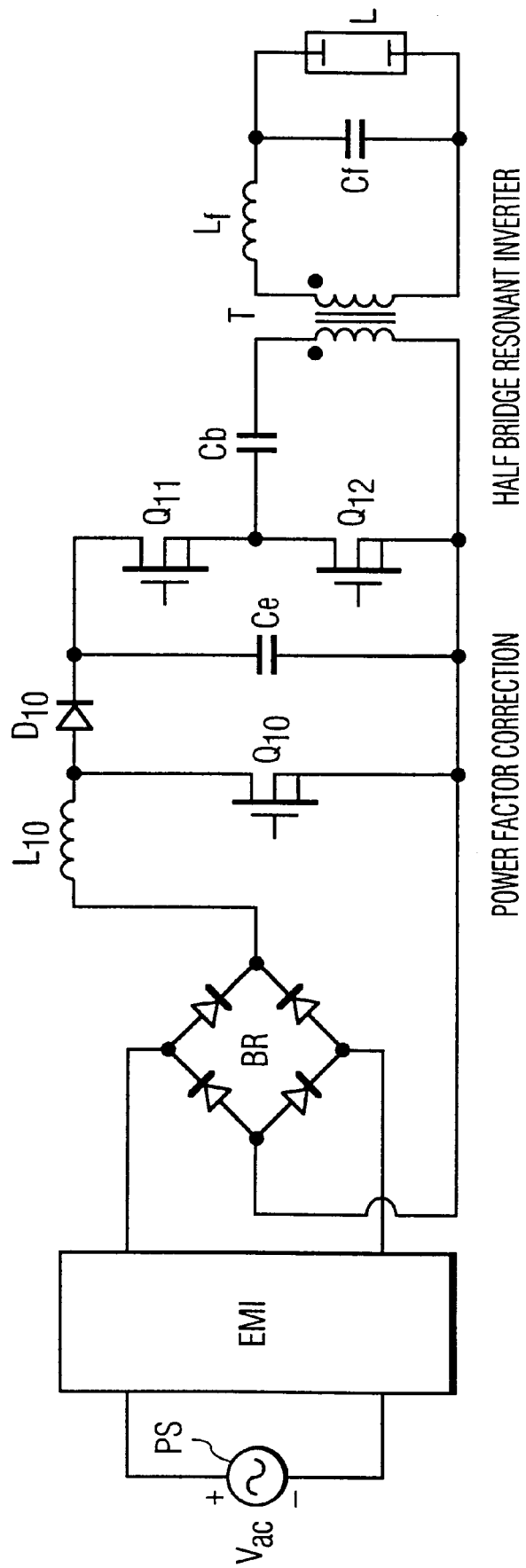
FIG. 1 is a schematic diagram of a prior art electronic ballast circuit.
Figure 2:
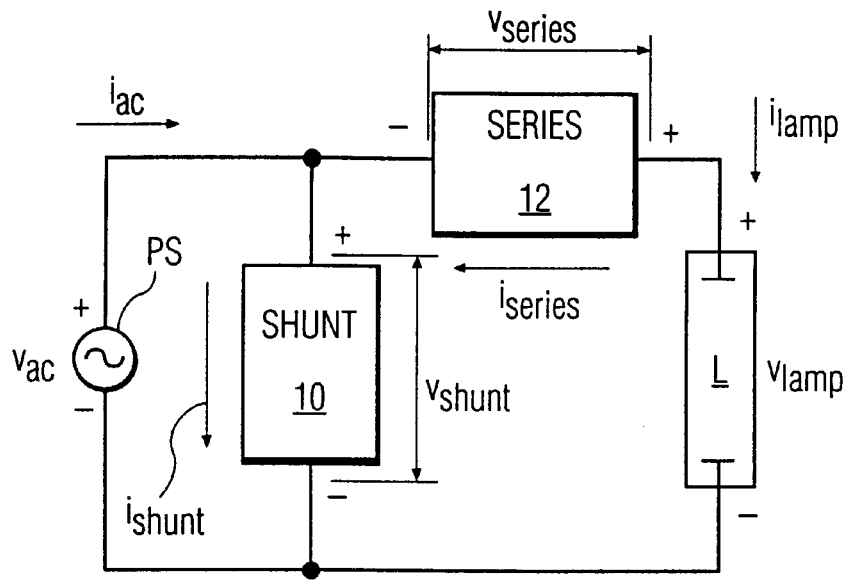
FIG. 2 is a schematic diagram of a discharge lamp system employing an electronic ballast in accordance with the invention.
Figure 3A:
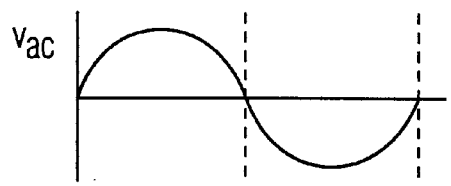
FIGS. 3a–3d are waveform diagrams illustrating operation of the system of FIG. 2.
Figure 3B:
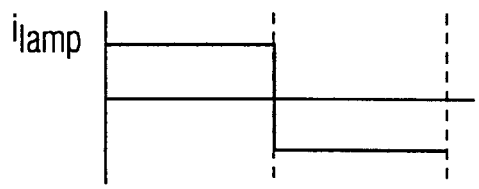
Figure 3C:
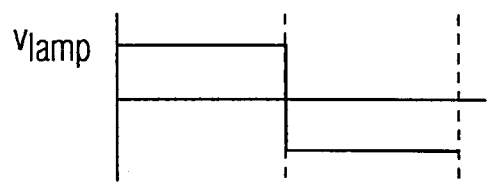
Figure 3D:
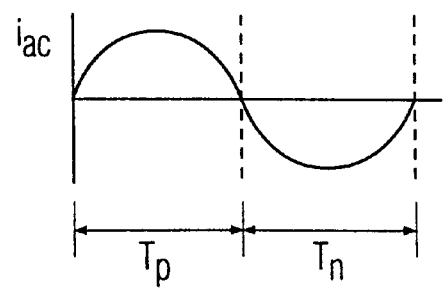

FIG. 2 illustrates a discharge lamp system employing an electronic ballast in accordance with the invention. As shown, the ballast includes a shunt energy-storage element 10, electrically connected in parallel with an AC power source PS, and a series energy-storage element 12, electrically connected in series with a discharge lamp L. The power source supplies sinusoidal voltage and current at a standard power utility frequency, e.g. 60 Hz. Note that the polarity symbols + and − indicate voltage polarities during positive half cycles of the power source voltage $v_{ac}$. The arrows indicate current directions as follows:

$i_{ac}$ represents the AC power source current during positive half cycles;

$i_{lamp}$ represents the lamp current during positive half cycles; and $i_{shunt}$ and $i_{series}$ represent the respective shunt and series storage element currents when electrical energy is being delivered to these elements.

FIGS. 3a–3d generally illustrate operation of the ballast. The shunt and series energy-storage elements, respectively, function to capacitively charge and discharge such that a sinusoidal source voltage $v_{ac}$ and current $i_{ac}$, supplied by the power source PS, is converted to a square-wave current $i_{lamp}$ and voltage $v_{lamp}$ for driving the discharge lamp L in synchronism with the source voltage and current. Thus, during each half cycle the lamp current and voltage remain at a constant DC value. Driving the discharge lamp with square-wave power yields a radiation efficiency which is equivalent to DC operation, which is significantly better than that obtainable with sinusoidal operation at the power source frequency.

Figure 4:
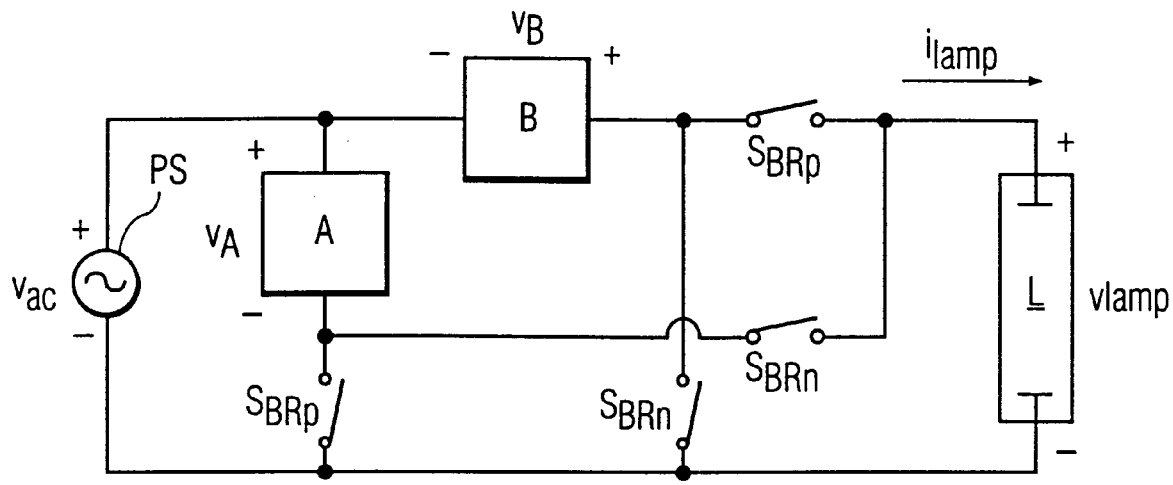
FIG. 4 is a schematic diagram showing the electronic ballast of FIG. 2 in greater detail.
Figure 5A:
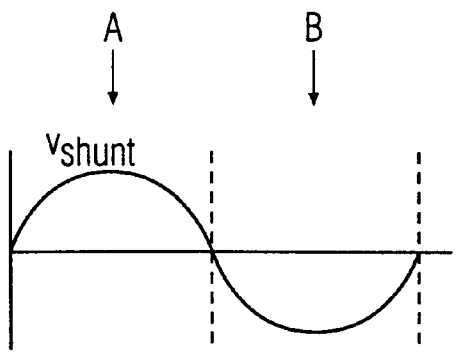
FIGS. 5a–5f are waveform diagrams illustrating energy characteristics of storage elements of the electronic ballast of FIG. 2.
Figure 5B:
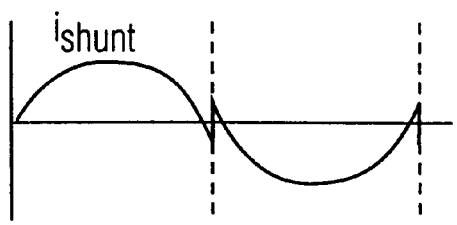
Figure 5C:
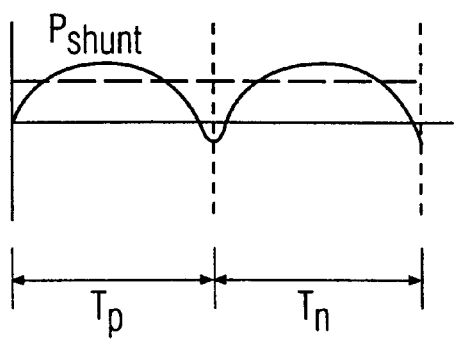
Figure 5D:
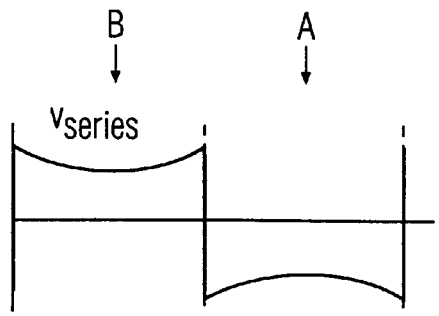
Figure 5E:
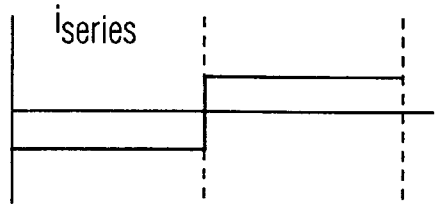
Figure 5F:
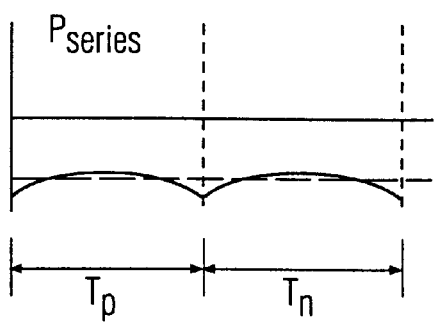

FIG. 4 illustrates more completely the electronic ballast shown in FIG. 2. The ballast includes, in addition to the power source PS and the discharge lamp L, two energy-storage elements A and B, two bridge switches $S_{BRp}$ and two bridge switches $S_{BRn}$. The bridge switches function to alternately switch each of the elements A and B to the shunt and series electrical connections shown in FIG. 2. Specifically, during each positive half-cycle of the AC source voltage $v_{ac}$, the two bridge switches $S_{BRp}$ are closed, thereby electrically connecting storage element A in parallel with the power source PS and storage element B in series with the discharge lamp L. Conversely, during each negative half-cycle of the AC source voltage $v_{ac}$, the two bridge switches $S_{BRn}$ are closed, thereby electrically connecting storage element B in parallel with the power source PS and storage element A in series with the discharge lamp L.

FIGS. 2, 3a–3d, 4, 5a–5f and 6a–6c collectively show how the shunt-connected energy-storage element 10 operates to continually accumulate energy from the power source PS while the series-connected energy-storage element 12 continually delivers energy to the discharge lamp L.

During each positive half cycle $T_p$ of the AC source voltage $v_{ac}$:

the voltage $v_{shunt}$ across the shunt storage element 10 (momentarily storage element A) is positive and has a magnitude equal to $v_{ac}$, the shunt current $i_{shunt}$ is also positive, except near the zero crossover of $v_{shunt}$, and net energy delivery to the shunt storage element (represented by the area under the power curve $P_{shunt}$) is positive; and the voltage $v_{series}$ across the series storage element 12 (momentarily storage element B) is positive and adds to the positive-polarity source voltage $v_{ac}$ to produce the positive half-cycle DC lamp voltage $v_{lamp}$, the series current $i_{series}$ is negative and has a magnitude equal to that of the DC lamp current $i_{lamp}$, and net energy delivery to the series storage element (represented by the area under the power curve $P_{series}$) is negative.

During each negative half cycle $T_n$ of the AC source voltage $v_{ac}$:

the voltage $v_{shunt}$ across the shunt storage element 10 (now momentarily storage element B) is negative and has a magnitude equal to $v_{ac}$, the shunt current $i_{shunt}$ is also negative, except near the zero crossover of $v_{shunt}$, and net energy delivery to the shunt storage element (represented by the area under the power curve $P_{shunt}$) is positive; and the voltage $v_{series}$ across the series storage element 12 (now momentarily storage element A) is negative and adds to the negative-polarity source voltage $v_{ac}$ to produce the negative half-cycle DC lamp voltage $v_{lamp}$, the series current $i_{series}$ is positive and has a magnitude equal to that of the DC lamp current $i_{lamp}$, and net energy delivery to the series storage element (represented by the area under the power curve $P_{series}$) is negative.

Note that, during the complete cycle encompassed by the time periods $T_p$ and $T_n$, the polarities of the voltages $v_A$ and $v_B$ on the energy-storage elements A and B, respectively, never reverse. This simplifies construction of the storage elements A and B.

Figure 7:
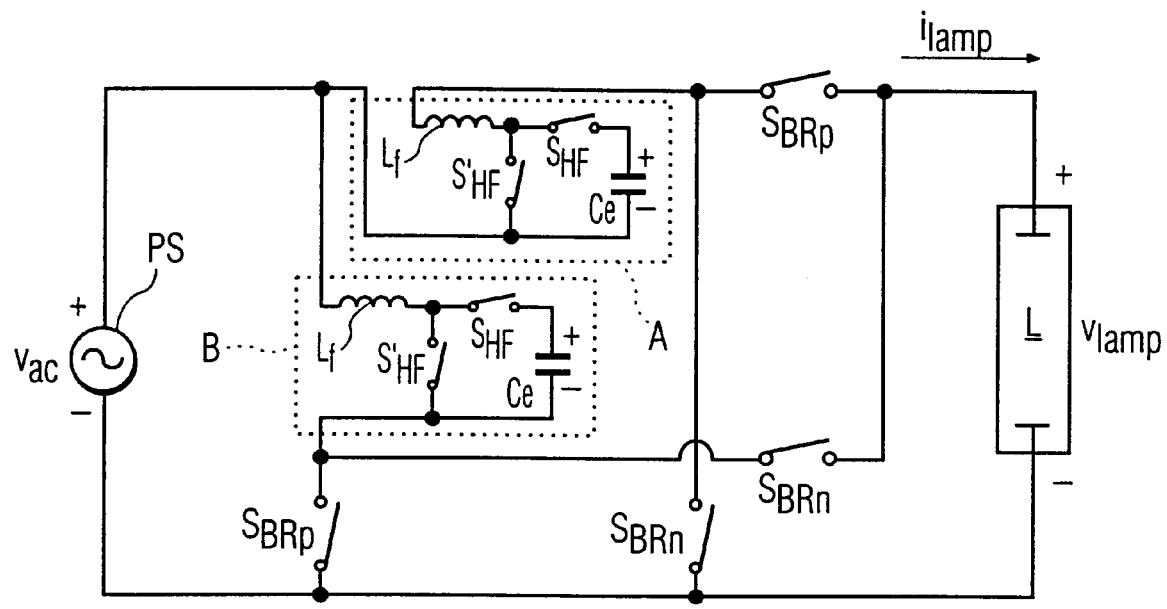
FIG. 7 is a schematic diagram showing a more-detailed embodiment of the electronic ballast of FIG. 4.

FIG. 7 shows the lamp system of FIG. 4, but includes more-detailed embodiments of the storage elements A and B. Each of these elements is identical and includes a charge-storage capacitor $C_e$, two high-frequency duty-cycle switches $S_{HF}$ and $S'_{HF}$, and a filter inductor $L_f$. All switches in the ballast, including the bridge switches $S_{BRp}$ and $S_{BRn}$, are indicated schematically only and will be implemented in actual circuitry by solid-state semiconductor switches, such as power MOSFETs.

Each of the two capacitors $C_e$ alternately charges from the power source PS and discharges to the lamp L, while maintaining the polarity shown. The two high-frequency duty-cycle switches $S_{HF}$ and $S'_{HF}$ in each storage element operate alternately during each of successive periods $T_{HF}$ which occur at a very high periodic rate (e.g. 100 kHz) relative to the periodic switching rate (e.g. 60 Hz) of the bridge switches $S_{BRp}$ and $S_{BRn}$. The filter inductor $L_f$ in each storage element blocks high-frequency switching components from reaching the power source and the lamp.

With respect to each of the storage elements A and B:

When the bridge switches electrically connect the storage element in parallel with the power source, the closing of switch $S_{HF}$ in the respective element places the respective capacitor $C_e$ in parallel with the power source (via the respective filter elements $L_f$), but the alternate closing of switch $S'_{HF}$ bypasses the capacitor. During each period $T_{HF}$ (e.g. 10 μsec), switch $S_{HF}$ closes for the duration $(D_p)T_{HF}$ and switch $S'_{HF}$ closes for the duration $(1-D_p)T_{HF}$, where $D_p = |v_{ac}|/v_{ce}$. Thus, the capacitor tends to be connected to (and charged by) the power source a large portion of periods $T_{HF}$ when the instantaneous power source voltage $v_{ac}$ has a large magnitude relative to the capacitor voltage $v_{ce}$, but to be bypassed a large portion of periods $T_{HF}$ when the instantaneous power source voltage $v_{ac}$ has a small magnitude relative to the capacitor voltage.

When the bridge switches electrically connect the storage element in series with the discharge lamp, the closing of switch $S_{HF}$ in the respective element places the respective capacitor $C_e$ in series with the lamp (via the respective filter inductors $L_f$), but the alternate closing of switch $S'_{HF}$ bypasses the capacitor. Now, during each period $T_{HF}$ switch $S_{HF}$ closes for the duration $(D_s)T_{HF}$ and switch $S'_{HF}$ closes for the duration $(1-D_s)T_{HF}$, where $D_s = |v_{lamp} - v_{ac}|/v_{ce}$. Thus, the capacitor tends to be connected in series with the lamp a large portion of periods $T_{HF}$ when the instantaneous power source voltage $v_{ac}$ has a lower magnitude relative to the desired lamp voltage, but to be bypassed a large portion of periods $T_{HF}$ when the instantaneous power source voltage $v_{ac}$ has a larger magnitude relative to the desired lamp voltage.

Note that the voltage drop across each of the filter inductors $L_f$ at the relatively low frequency of the voltages $v_A$ and $v_B$ is considered to be substantially equal to zero. Note further that, although no specific circuitry is described for duty-cycle modulating the switches $S_{HF}$ and $S'_{HF}$ in response to variations between the voltages $v_{ac}$, $v_{lamp}$ and $v_{ce}$, many suitable circuits are well known in the art. See, for example, Principles of Power Electronics by John G. Kassakian, Martin F. Schlecht & George C. Verghese, pages 268–269, Addison-Wesley Publishing Company, 1991.

Figure 8:
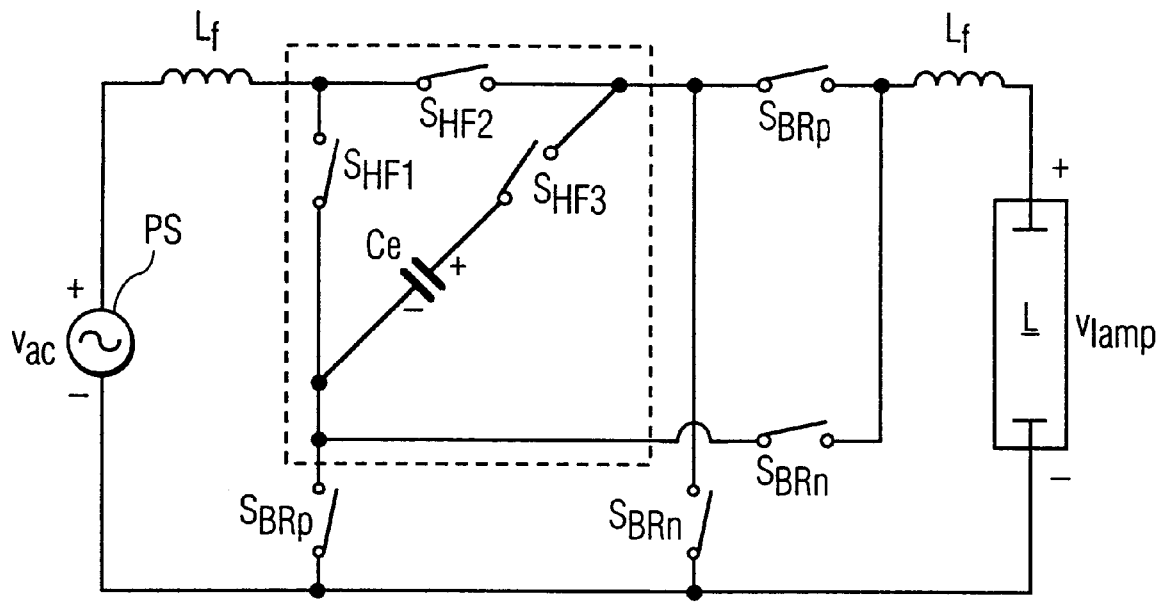
FIG. 8 is a schematic diagram of a discharge lamp system incorporating another embodiment of an electronic ballast in accordance with the invention.

FIG. 8 shows a lamp system including an embodiment of an electronic ballast in which only a single charge-storage capacitor is used to produce the voltage and current waveforms shown in FIGS. 3a–3d. As shown, the ballast includes a first filter inductor $L_f$ in series with a power source PS, a second filter inductor $L_f$ in series with a discharge lamp L, the charge-storage capacitor $C_e$, two bridge switches $S_{BRp}$, two bridge switches $S_{BRn}$, and three high-frequency duty-cycle switches $S_{HF1}$, $S_{HF2}$ and $S_{HF3}$. The four bridge switches function to alternate the polarity with which the capacitor $C_e$ is connected in the ballast during positive and negative half cycles of the power source voltage $v_{ac}$. The three high-frequency switches function to successively switch the capacitor $C_e$ to each of three different states of connection:

electrically connected in parallel with the power source PS (via the respective filter inductor $L_f$);

electrically connected in series with the lamp L (via the respective filter inductor $L_f$) and in the same polarity direction such that the voltages $v_{ac}$ and $v_{ce}$ complement each other;

operatively disconnected.

The two filter inductors $L_f$ block high-frequency switching components from reaching the power source and the lamp. The filter inductor connected in series with the lamp L also ensures that the lamp voltage $v_{lamp}$ is affected by the duty-cycle or average value of the storage capacitor voltage $v_{ce}$ in each of the above-listed states of connection where the capacitor is electrically connected to the lamp.

Figure 6A:
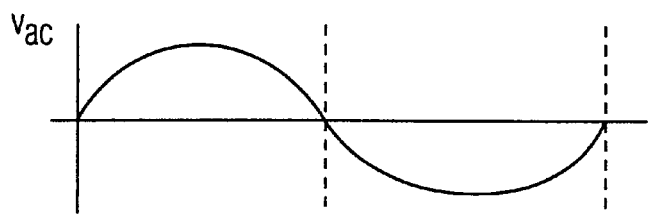
FIGS. 6a–6c are timing diagrams illustrating operation of bridge switches in various embodiments of the invention.
Figure 6B:
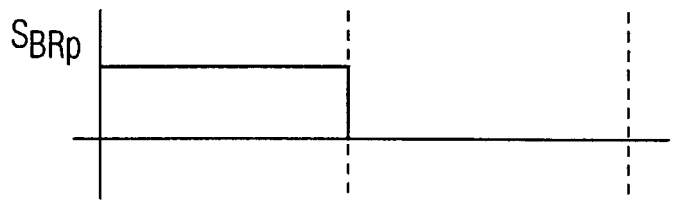
Figure 6C:
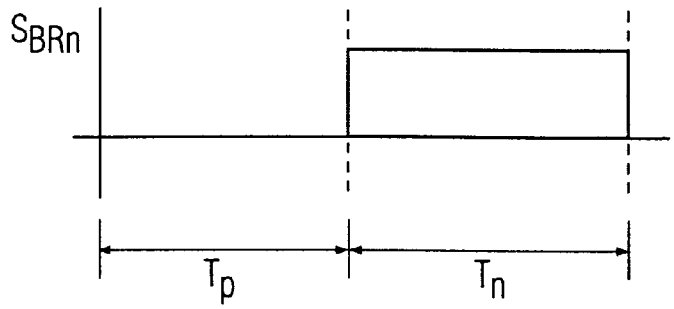

Operation of the bridge switches is in accordance with the timing shown in FIGS. 6a–6c. Specifically, during each positive half-cycle of the AC source voltage $v_{ac}$, the two bridge switches $S_{BRp}$ are closed, thereby electrically connecting the negative electrode of the storage capacitor $C_e$ to the terminal of the power source PS which is momentarily negative. Conversely, during each negative half-cycle of the AC source voltage $v_{ac}$, the two bridge switches $S_{BRn}$ are closed, thereby electrically connecting the positive electrode of the storage capacitor to the terminal of the power source PS which is now momentarily positive.

Figure 9A:
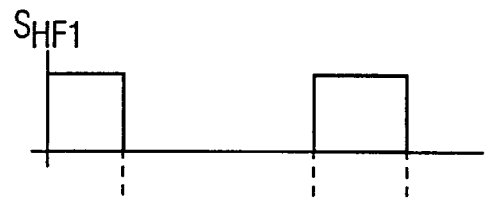
FIGS. 9a–9f are timing diagrams illustrating operation of high-frequency switches in the embodiment of FIG. 8.
Figure 9B:
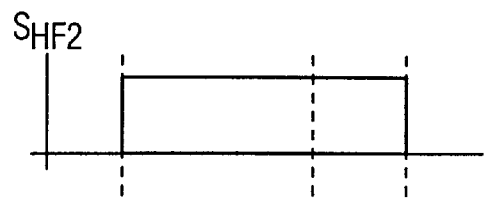
Figure 9C:
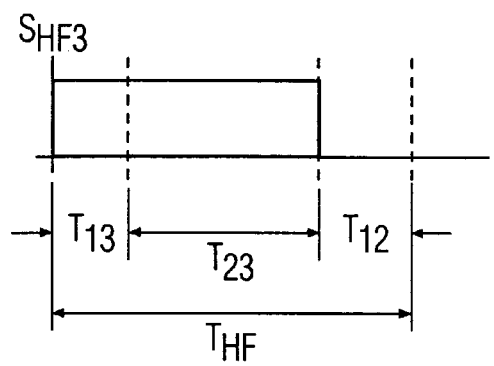
Figure 9D:
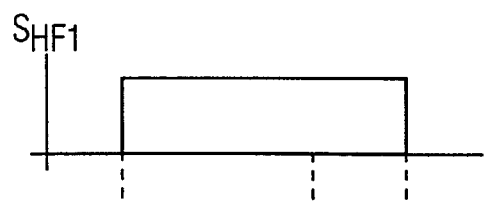
Figure 9E:
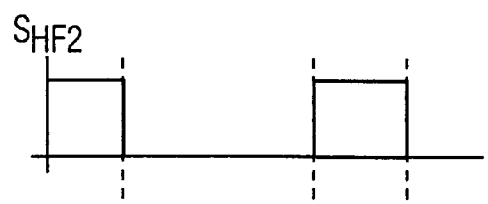
Figure 9F:
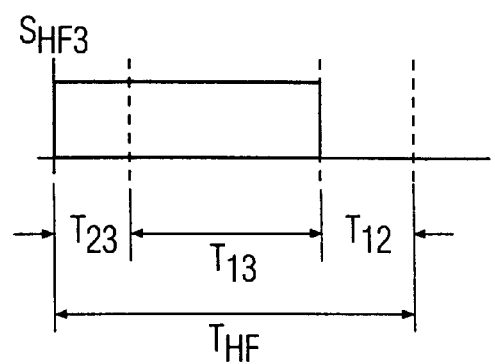

Operation of the three high-frequency duty-cycle switches is in accordance with the timing shown in FIGS. 9a–9f. FIGS. 9a–9c illustrate operation during each positive half-cycle of the AC source voltage, while FIGS. 9d–9f illustrate operation during each negative half-cycle. The periods $T_{HF}$ shown repeat at a very high periodic rate (e.g. 100 kHz) relative to the periodic switching rate (e.g. 60 Hz) of the bridge switches. Each period $T_{HF}$ is divided into three successive sub-periods during which two of the three high-frequency switches always remain closed, to avoid interrupting current flow through the lamp and the power source. Specifically, in this exemplary embodiment:

switches $S_{HF1}$ and $S_{HF2}$ are closed during a respective sub-period $T_{12}$;

switches $S_{HF1}$ and $S_{HF3}$ are closed during a respective sub-period $T_{13}$;

switches $S_{HF2}$ and $S_{HF3}$ are closed during a respective sub-period $T_{23}$.

Referring to FIGS. 8 and 9a–9c together, it can be seen that during each positive half cycle of the source voltage $v_{ac}$, with the two bridge switches $S_{BRp}$ closed, the high-frequency switch pairs close in the sequence:

$S_{HF1}$ and $S_{HF3}$ closed simultaneously, thereby electrically connecting the storage capacitor $C_e$ in series with the power source and the lamp;

$S_{HF2}$ and $S_{HF3}$ closed simultaneously, thereby electrically connecting the storage capacitor in parallel with the power source;

$S_{HF1}$ and $S_{HF2}$ closed simultaneously, thereby operatively disconnecting the storage capacitor from the power source and the lamp.

Similarly, referring to FIGS. 8 and 9d–9f together, it can be seen that during each negative half cycle of the source voltage $v_{ac}$, with the two bridge switches $S_{BRn}$ closed, the high-frequency switch pairs close in the sequence:

$S_{HF2}$ and $S_{HF3}$ closed simultaneously, thereby electrically connecting the storage capacitor $C_e$ in series with the power source and the lamp;

$S_{HF1}$ and $S_{HF3}$ closed simultaneously, thereby electrically connecting the storage capacitor in parallel with the power source;

$S_{HF1}$ and $S_{HF2}$ closed simultaneously, thereby operatively disconnecting the storage capacitor from the power source and the lamp.

The durations of the sub-periods depend on the state of connection of the storage capacitor. Specifically:

When the capacitor is electrically connected in parallel with the power source (during sub-period $T_{23}$ in the positive half cycles and $T_{13}$ in the negative half cycles), the duration of these sub-periods is $(D_{parallel})T_{HF}$, where $D_{parallel}=|v_{ac}|/v_{ce}$. Thus the capacitor tends to be connected to (and charged by) the power source a large portion of periods $T_{HF}$ when the instantaneous power-source voltage $v_{ac}$ has a large magnitude relative to the capacitor voltage $v_{ce}$.

When the capacitor is electrically connected in series with the discharge lamp (during sub-period $T_{13}$ in the positive half cycles and $T_{23}$ in the negative half cycles), the duration of these sub-periods is $(D_{series})T_{HF}$, where $D_{series}=|v_{lamp}-v_{ac}|/v_{ce}$. Thus the capacitor tends to be connected in series with the lamp a large portion of periods $T_{HF}$ when the instantaneous power-source voltage $v_{ac}$ has a lower magnitude relative to the desired lamp operating voltage $v_{lamp}$.

When the capacitor is operatively disconnected (during sub-period $T_{12}$ in both the positive and negative half cycles), the duration of this sub-period is $(D_{disconnect})T_{HF}$, where $D_{disconnect}=v_{ce}-|v_{lamp}|/v_{ce}$. The disconnected state enables independent control of the duty-cycle ratios $D_{parallel}$ and $D_{series}$. Note that $D_{parallel}+D_{series}+D_{disconnect}=1$.

Figure 10:
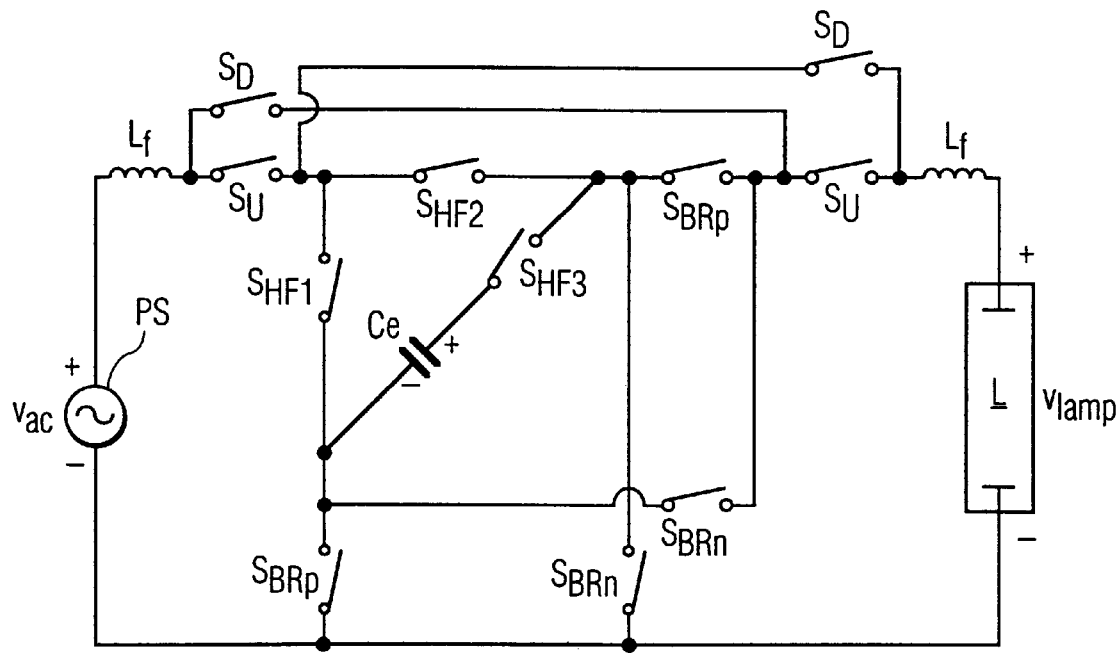
FIG. 10 is a schematic diagram of a discharge lamp system incorporating another embodiment of an electronic ballast in accordance with the invention.
Figure 11A:
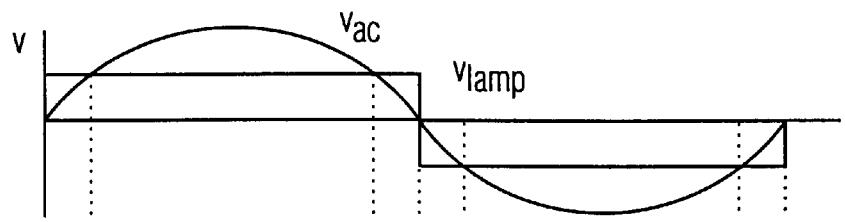
FIGS. 11a–11e are timing diagrams generally illustrating operation of the embodiment of FIG. 10.
Figure 11B:
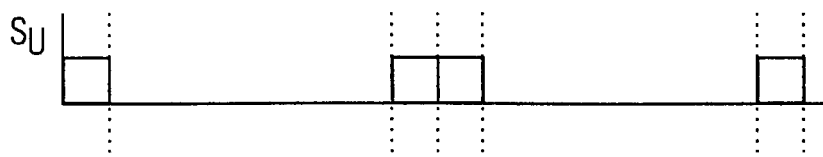
Figure 11C:
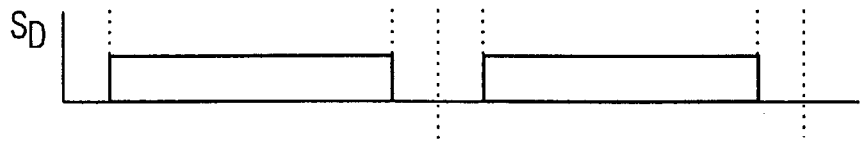
Figure 11D:
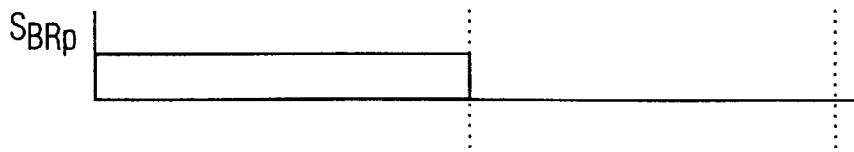
Figure 11E:

One of the limitations of the ballasts of FIGS. 7 and 8 is that the power-source voltage must be lower than the lamp voltage, unless some modification is made. FIG. 10 illustrates one possible modification of the FIG. 8 ballast which is capable of producing a lamp voltage that is not limited by the power source voltage. The ballast of FIG. 10 is capable of both up-conversion and down-conversion of the power-source voltage $v_{ac}$. This ballast is identical to that of FIG. 8, except for the addition of:

a pair of up-conversion switches $S_U$ for electrically connecting the storage capacitor $C_e$ and the high-frequency switches in an up-conversion mode during a portion of each half cycle of the power source voltage; and a pair of down-conversion switches $S_D$ for electrically connecting the storage capacitor $C_e$ and the high-frequency switches in a down-conversion mode during a different portion of each half cycle of the power source voltage.

FIGS. 11a–11e illustrate the operation, during a complete cycle of the power source voltage, of the up and down conversion switches $S_U$ and $S_D$ and of the positive and negative bridge switches $S_{BRp}$ and $S_{BRn}$. Note that the up-conversion switches $S_U$ close when the AC source voltage $v_{ac}$ is lower than the desired operating voltage of the lamp $v_{lamp}$. Conversely, the down-conversion switches $S_D$ close when the AC source voltage $v_{ac}$ is higher than the desired operating voltage of the lamp $v_{lamp}$.

Whenever the up-conversion switches are closed, the ballast configuration is identical to that of FIG. 8 and operation is also identical to that described for the FIG. 8 embodiment.

Whenever the down-conversion switches are closed, the ballast configuration and operation changes with respect to the high-frequency duty-cycle switches $S_{HF1}$, $S_{HF2}$ and $S_{HF3}$. Now the three high-frequency switches function to successively switch the capacitor $C_e$ to each of three different states of connection:

electrically connected in parallel with the lamp L (via the respective filter inductor $L_f$);

electrically connected in series with the power source PS (via the respective filter inductor $L_f$) but in the opposite polarity direction such that the voltages $v_{ac}$ and $v_{ce}$ work against each other to decrease (from $v_{ac}$) the voltage applied to the lamp;

operatively disconnected.

Figure 12A:
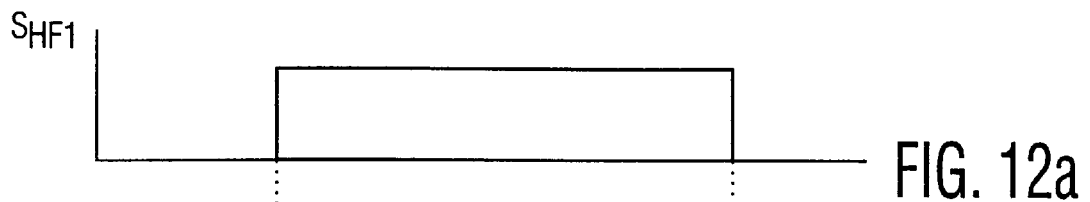
FIGS. 12a–12f are timing diagrams illustrating operation of high-frequency switches in the embodiment of FIG. 10.
Figure 12B:
Figure 12C:
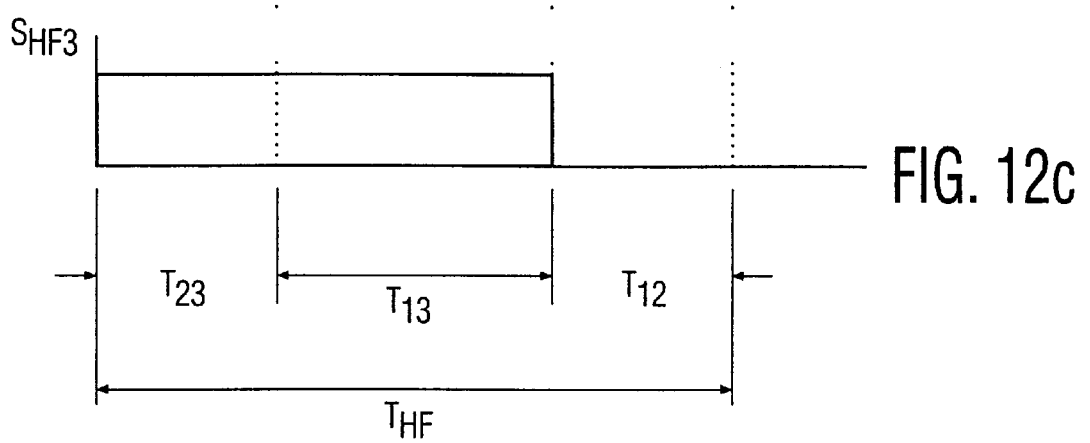
Figure 12D:
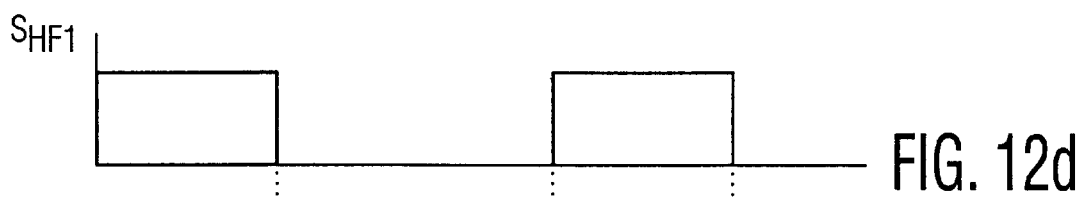
Figure 12E:
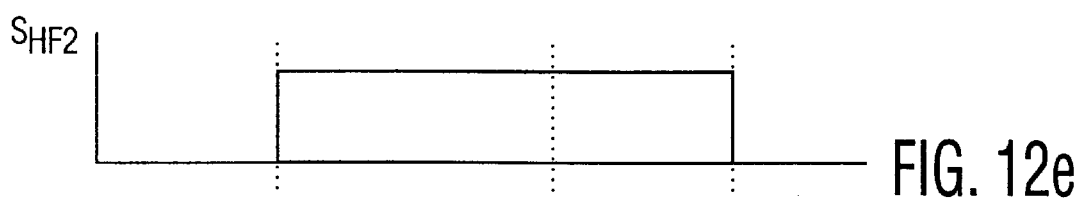
Figure 12F:
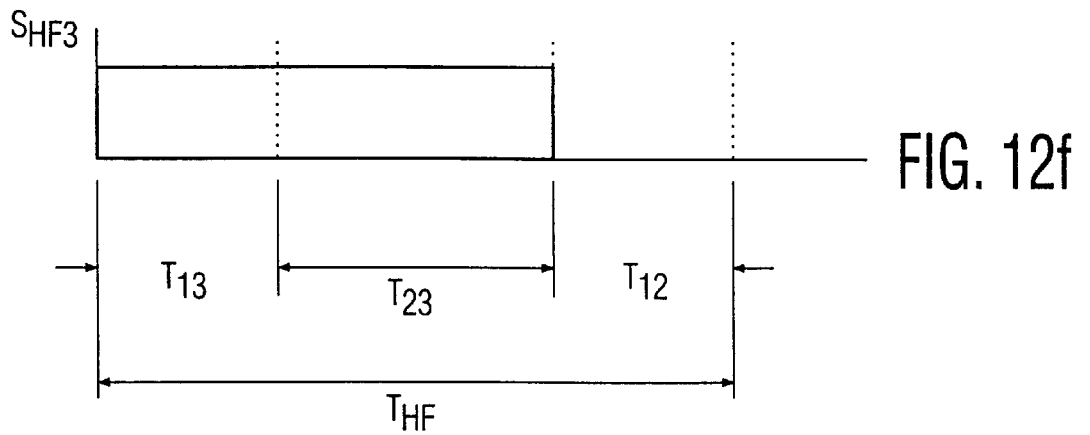

Operation of the three high-frequency duty-cycle switches is in accordance with the timing shown in FIGS. 12a–12f. FIGS. 12a–12c illustrate operation during each positive half-cycle of the AC source voltage, while FIGS. 12d–12f illustrate operation during each negative half-cycle.

Referring to FIGS. 10 and 12a–12c together, it can be seen that during each positive half cycle of the source voltage $v_{ac}$, with the switches $S_D$ and $S_{BRp}$ closed, the high-frequency switch pairs close in the sequence:

$S_{HF2}$ and $S_{HF3}$ closed simultaneously, thereby electrically connecting the storage capacitor $C_e$ in parallel with the lamp;

$S_{HF1}$ and $S_{HF3}$ closed simultaneously, thereby electrically connecting the storage capacitor in series with the power source and the lamp, with the polarities of $v_{ac}$ and $v_{ce}$ opposing each other;

$S_{HF1}$ and $S_{HF2}$ closed simultaneously, thereby operatively disconnecting the storage capacitor from the power source and the lamp.

Similarly, referring to FIGS. 10 and 12d–12f together, it can be seen that during each negative half cycle of the source voltage $v_{ac}$, with the switches $S_D$ and $S_{BRn}$ closed, the high-frequency switch pairs close in the sequence:

$S_{HF1}$ and $S_{HF3}$ closed simultaneously, thereby electrically connecting the storage capacitor $C_e$ in parallel with the lamp;

$S_{HF2}$ and $S_{HF3}$ closed simultaneously, thereby electrically connecting the storage capacitor in series with the power source and the lamp, with the polarities of $v_{ac}$ and $v_{ce}$ opposing each other;

$S_{HF1}$ and $S_{HF2}$ closed simultaneously, thereby operatively disconnecting the storage capacitor from the power source and the lamp.

The durations of the sub-periods depend on the state of connection of the storage capacitor. Specifically:

When the capacitor is electrically connected in parallel with the lamp (during sub-period $T_{23}$ in the positive half cycles and $T_{13}$ in the negative half cycles), the duration of these sub-periods is $(D_{parallel})T_{HF}$, where $D_{parallel}=|v_{lamp}|/v_{ce}$. Thus the capacitor tends to be connected to (and charged by) the power source a large portion of periods $T_{HF}$ when the instantaneous lamp voltage $v_{lamp}$ has a large magnitude relative to the capacitor voltage $v_{ce}$.

When the capacitor is electrically connected in series opposition with the power source (during sub-period $T_{13}$ in the positive half cycles and $T_{23}$ in the negative half cycles), the duration of these sub-periods is $(D_{series})T_{HF}$, where $D_{series}=|v_{ac}-v_{lamp}|/v_{ce}$. Thus the capacitor tends to be connected in series opposition with the power source a large portion of periods $T_{HF}$ when the instantaneous power-source voltage $v_{ac}$ has a higher magnitude relative to the desired lamp voltage.

When the capacitor is operatively disconnected (during sub-period $T_{12}$ in both the positive and negative half cycles), the duration of this sub-period is $(D_{disconnect})T_{HF}$, where $D_{disconnect}=(v_{ce}-|v_{ac}|)/v_{ce}$.

As in the embodiment of FIG. 10, $D_{parallel}+D_{series}+D_{disconnect}=1$.

Figure 13:
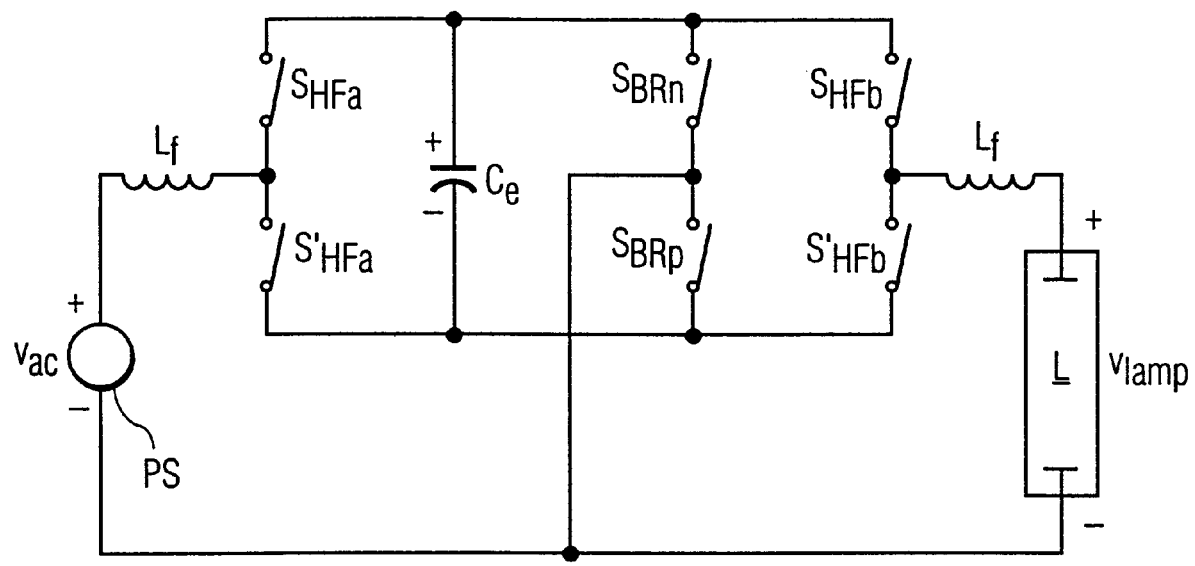
FIG. 13 is a schematic diagram of a discharge lamp system incorporating another embodiment of an electronic ballast in accordance with the invention.

FIG. 13 shows a lamp system including another embodiment of an electronic ballast in which only a single charge-storage capacitor is used to produce the voltage and current waveforms shown in FIGS. 3a–3d. As shown, the ballast includes a first filter inductor $L_f$ in series with a power source PS, a second filter inductor $L_f$ in series with a discharge lamp L, the charge-storage capacitor $C_e$, a bridge switch $S_{BRp}$, a bridge switch $S_{BRn}$, a first pair of alternately-closed, high-frequency, duty-cycle switches $S_{HFa}$ and $S'_{HFa}$, and a second pair of alternately-closed, high-frequency, duty-cycle switches $S_{HFb}$ and $S'_{HFb}$. The two bridge switches function to alternate the polarity with which the capacitor $C_e$ is connected in the ballast during positive and negative half cycles of the power source voltage $v_{ac}$. The two pairs of high-frequency switches function to switch the storage capacitor $C_e$ to any of four different possible states of connection, i.e. with switches $S_{HFa}$ and $S_{HFb}$ closed, switches $S_{HFa}$ and $S'_{HFb}$ closed, switches $S'_{HFa}$ and $S_{HFb}$ closed, and switches $S'_{HFa}$ and $S'_{HFb}$ closed.

Operation of the bridge switches is in accordance with the timing shown in FIGS. 6a–6c. Specifically, during each positive half-cycle of the AC source voltage $v_{ac}$, the bridge switch $S_{BRp}$ is closed, thereby electrically connecting the negative electrode of the storage capacitor $C_e$ to the terminal of the power source PS which is momentarily negative. Conversely, during each negative half-cycle of the AC source voltage $v_{ac}$, the bridge switch $S_{BRn}$ is closed, thereby electrically connecting the positive electrode of the storage capacitor to the terminal of the power source PS which is now momentarily positive.

The two pairs of high-frequency duty-cycle switches operate independently of each other. They all operate continually, during both the positive and the negative half-cycles of the AC source voltage, at a very high periodic rate (e.g. 100 kHz) relative to the periodic switching rate (e.g. 60 Hz) of the bridge switches. However, at any instant in time, only one of the switches in each pair is closed.

Note that the ballast of FIG. 13 may be operated either in an up-converter ($v_{ac} \leq v_{lamp}$) mode or in a down-converter ($v_{ac} \geq v_{lamp}$) mode. Both modes of operation are described:

Up-converter Mode

During each of the high-frequency periods $T_{HF}$ (e.g. 10 μsec) that occurs when $v_{ac}$ is in a positive half cycle:

switch $S_{HFa}$ is closed for the duration $(D_{pa})T_{HF}$ and switch $S'_{HFa}$ is closed for the remainder of the respective period, i.e. for the duration $(1-D_{pa})T_{HF}$, where $D_{pa}=|v_{ac}|/v_{ce}$; and switch $S_{HFb}$ is closed for the duration $(D_{pb})T_{HF}$ and switch $S'_{HFb}$ is closed for the remainder of the respective period, i.e. for the duration $(1-D_{pb})T_{HF}$, where $D_{pb}=|v_{lamp}|/v_{ce}$.

Similarly, during each of the high-frequency periods $T_{HF}$ that occurs when $v_{ac}$ is in a negative half cycle:

switch $S'_{HFa}$ is closed for the duration $(D_{na})T_{HF}$ and switch $S_{HFa}$ is closed for the remainder of the respective period, i.e. for the duration $(1-D_{na})T_{HF}$, where $D_{na}=|v_{ac}|/v_{ce}$; and switch $S'_{HFb}$ is closed for the duration $(D_{nb})T_{HF}$ and switch $S_{HFb}$ is closed for the remainder of the respective period, i.e. for the duration $(1-D_{nb})T_{HF}$, where $D_{nb}=|v_{lamp}|/v_{ce}$.

Three important instants of connection of the storage capacitor $C_e$ exist:

a parallel state, when the capacitor is electrically connected in parallel with the power source PS (via respective filter inductor $L_f$);

a series state, when the capacitor is electrically connected in series with the discharge lamp (via respective filter inductor $L_f$), and in the same polarity direction, such that the voltages $v_{ac}$ and $v_{ce}$ complement each other;

operatively disconnected.

The parallel state occurs only when:

in positive half cycles $S_{HFa}$ is closed, i.e. for the duration $(D_{pa})T_{HF}$, where $D_{pa}=|v_{ac}|/v_{ce}$; and in negative half cycles $S'_{HFa}$ is closed, i.e. for the duration $(D_{na})T_{HF}$, where $D_{na}=|v_{ac}|/v_{ce}$.

Thus the capacitor tends to be connected in parallel with (and charged by) the power source during portions of both the positive and negative half cycles when the instantaneous power-source voltage $v_{ac}$ has a large magnitude relative to the capacitor voltage $v_{ce}$.

The series state occurs only when:

in positive half cycles $S'_{HFa}$ and $S_{HFb}$ are closed simultaneously, i.e. for overlapping sub-periods having the durations $(1-D_{pa})T_{HF}$ (where $D_{pa}=|v_{ac}|/v_{ce}$) and $(D_{pb})T_{HF}$ (where $D_{pb}=|v_{lamp}|/v_{ce}$); and in negative half cycles $S_{HFa}$ and $S'_{HFb}$ are closed simultaneously, i.e. for overlapping sub-periods having the durations $(1-D_{na})T_{HF}$ (where $D_{na}=|v_{ac}|/v_{ce}$) and $(D_{nb})T_{HF}$ (where $D_{nb}=|v_{lamp}|/v_{ce}$).

Thus the capacitor tends to be connected in series with the lamp and the power source when the magnitude of the instantaneous power source voltage tends to be small relative to the magnitude of the lamp voltage.

The disconnected state occurs only when:

in positive half cycles $S'_{HFa}$ and $S'_{HFb}$ are closed simultaneously, i.e. for overlapping sub-periods having the durations $(1-D_{pa})T_{HF}$ (where $D_{pa}=|v_{ac}|/v_{ce}$) and $(1-D_{pb})T_{HF}$ (where $D_{pb}=|v_{lamp}|/v_{ce}$); and in negative half cycles $S_{HFa}$ and $S_{HFb}$ are closed simultaneously, i.e. for overlapping sub-periods having the durations $(1-D_{na})T_{HF}$ (where $D_{na}=|v_{ac}|/v_{ce}$) and $(1-D_{nb})T_{HF}$ (where $D_{nb}=|v_{lamp}|/v_{ce}$).

Down-converter Mode

During each of the high-frequency periods $T_{HF}$ (e.g. 10 $\mu$sec) that occurs when $v_{ac}$ is in a positive half cycle:

switch $S_{HFa}$ is closed for the duration $(D_{pa})T_{HF}$ and switch $S'_{HFa}$ is closed for the remainder of the respective period, i.e. for the duration $(1-D_{pa})T_{HF}$, where $D_{pa}=|v_{ac}|/v_{ce}$; and switch $S'_{HFb}$ is closed for the duration $(D_{pb})T_{HF}$ and switch $S'_{HFb}$ is closed for the remainder of the respective period, i.e. for the duration $(1-D_{pb})T_{HF}$, where $D_{pb}=|v_{lamp}|/v_{ce}$.

Similarly, during each of the high-frequency periods $T_{HF}$ that occurs when $v_{ac}$ is in a negative half cycle:

switch $S'_{HFa}$ is closed for the duration $(D_{na})T_{HF}$ and switch $S_{HFa}$ is closed for the remainder of the respective period, i.e. for the duration $(1-D_{na})T_{HF}$, where $D_{na}=|v_{ac}|/v_{ce}$; and switch $S'_{HFb}$ is closed for the duration $(D_{nb})T_{HF}$ and switch $S_{HFb}$ is closed for the remainder of the respective period, i.e. for the duration $(1-D_{nb})T_{HF}$, where $D_{nb}=|v_{lamp}|)/v_{ce}$.

Three important states of connection of the storage capacitor $C_e$ exist:

a parallel state, when the capacitor is electrically connected in parallel with the lamp (via respective filter inductor $L_f$); and a series state, when the capacitor is electrically connected in series with the power source (via respective filter inductor $L_f$), but in the opposite polarity direction, such that the voltages $v_{ac}$ and $v_{ce}$ work against each other to decrease (from $v_{ac}$) the voltage applied to the lamp;

operatively disconnected.

The parallel state occurs only when:

in positive half cycles $S_{HFb}$ is closed, i.e. for the duration $(D_{pb})T_{HF}$, where $D_{pb}=|v_{lamp}|/v_{ce}$; and in negative half cycles $S'_{HFb}$ is closed, i.e. again for the duration $(D_{nb})T_{HF}$, where $D_{nb}=|v_{lamp}|/v_{ce}$.

Thus the capacitor is connected in parallel with the lamp for sub-periods that are proportional to the lamp voltage.

The series state occurs only when:

in positive half cycles $S_{HFa}$ and $S'_{HFb}$ are closed simultaneously, i.e. for overlapping sub-periods having the durations $(D_{pa})T_{HF}$ (where $D_{pa}=|v_{ac}|/v_{ce}$) and $(1-D_{pb})T_{HF}$ (where $D_{pb}=|v_{lamp}|/v_{ce}$); and in negative half cycles $S'_{HFa}$ and $S_{HFb}$ are closed simultaneously, i.e. for overlapping sub-periods having the durations $(D_{na})T_{HF}$ (where $D_{na}=|v_{ac}|/v_{ce}$) and $(1-D_{nb})T_{HF}$ (where $D_{nb}=|v_{lamp}|/v_{ce}$).

Thus the capacitor tends to be connected in series with the lamp and the power source when the magnitude of the instantaneous power source voltage tends to be large relative to the magnitude of the lamp voltage.

The disconnected state occurs only when:

in positive half cycles $S'_{HFa}$ and $S'_{HFb}$ are closed simultaneously, i.e. for overlapping sub-periods having the durations $(1-D_{pa})T_{HF}$ (where $D_{pa}=|v_{ac}|/v_{ce}$) and $(1-D_{pb})T_{HF}$ (where $D_{pb}=|v_{lamp}|/v_{ce}$) and;

in negative half cycles $S_{HFa}$ and $S_{HFb}$ are closed simultaneously, i.e. for overlapping sub-periods having the durations $(1-D_{na})T_{HF}$ (where $D_{na}=|v_{ac}|/v_{ce}$) and $(1-D_{nb})T_{HF}$ (where $D_{nb}=|v_{lamp}|/v_{ce}$).

We claim:

1. An electronic ballast for converting an alternating voltage and current of predetermined waveform and frequency, supplied by a power source, to an alternating square-wave voltage and current of said frequency for supply to a discharge lamp, said ballast comprising:

a. at least one capacitive storage means;
   b. bridge switching means and high-frequency duty-cycle switching means for cooperating to periodically:
      i. electrically connect the at least one capacitive storage means in parallel with the power source;
      ii. electrically connect the at least one capacitive storage means in series with the power source and the discharge lamp; and
      iii. regulate the average current provided to and from the at least one capacitive storage means to effect production of said square-wave voltage and current.

2. An electronic ballast as in claim 1 where the bridge switching means electrically connects the at least one capacitive storage means in parallel with the power source during positive half cycles of the power-source voltage and electrically connects said at least one capacitive storage means in series with the discharge lamp during negative half cycles of the power-source voltage.

3. An electronic ballast as in claim 1 where the at least one capacitive storage means comprises first and second capacitive storage means, said bridge switching means alternately:

a. electrically connecting the first capacitive storage means in parallel with the power source while electrically connecting the second capacitive storage means in series with the discharge lamp; and
   b. electrically connecting the second capacitive storage means in parallel with the power source while electrically connecting the first capacitive storage means in series with the discharge lamp.

4. An electronic ballast as in claim 1 where the at least one capacitive storage means comprises a single capacitive storage means which said bridge switching means alternately electrically connects in parallel with the power source and in series with the discharge lamp.

5. An electronic ballast as in claim 1 where the square-wave current supplied to the discharge lamp is in synchronism with the alternating current supplied by the power source.

6. An electronic ballast for converting an alternating voltage and current of predetermined waveform and frequency, supplied by a power source, to an alternating square-wave voltage and current of said frequency for supply to a discharge lamp, said ballast comprising:

a. first and second capacitive storage means;
b. bridge switching means for alternately:
   i. electrically connecting the first capacitive storage means in parallel with the power source while electrically connecting the second capacitive storage means in series with the discharge lamp;
   ii. electrically connecting the second capacitive storage means in parallel with the power source while electrically connecting the first capacitive storage means in series with the discharge lamp; and
c. duty-cycle switching means for regulating the average current provided to and from the first and second capacitive storage means to effect production of said square-wave voltage and current, said duty-cycle switching means effecting net energy delivery to each of the capacitive storage means when said storage means is electrically connected in parallel with the power source and effecting net energy delivery from each of the capacitive storage means when said storage means is electrically connected in series with the discharge lamp.

7. An electronic ballast as in claim 6 where the duty-cycle switching means includes high-frequency switching means for:
   a. during electrical connection by the bridge switching means of either of the first and second capacitive storage means in parallel with the power source, alternately completing and interrupting a current path between said capacitive storage means and the power source, said current path being completed for a duty cycle which is dependent on the instantaneous magnitude of the power source voltage; and
   b. during electrical connection by the bridge switching means of either of the first and second capacitive storage means in series with the discharge lamp, alternately completing and interrupting a current path between said capacitive storage means and the discharge lamp, said current path being completed for a duty cycle which is dependent on the instantaneous magnitude of the difference between the discharge-lamp voltage and the power-source voltage.

8. An electronic ballast for converting an alternating voltage and current of predetermined waveform and frequency, supplied by a power source, to an alternating square-wave voltage and current of said frequency for supply to a discharge lamp, said ballast comprising:
   a. first and second capacitive storage means; and
   b. bridge switching means for alternately:
      i. electrically connecting the first capacitive storage means in parallel with the power source while electrically connecting the second capacitive storage means in series with the discharge lamp;
      ii. electrically connecting the second capacitive storage means in parallel with the power source while electrically connecting the first capacitive storage means in series with the discharge lamp;
   said first and second capacitive storage means each including a capacitive storage element and high-frequency switching means, said high-frequency switching means alternately completing and interrupting current flow through the respective capacitive storage element.

9. An electronic ballast for converting an alternating voltage and current of predetermined waveform and frequency, supplied by a power source, to an alternating square-wave voltage and current of said frequency for supply to a discharge lamp, said ballast comprising:

a. a capacitive storage means;
b. bridge switching means for alternately reversing the polarity with which the capacitive storage means is electrically connected in the ballast;
c. duty-cycle switching means for operating at a high frequency relative to the bridge switching means to repeatedly electrically connect the capacitive storage means in at least:
   i. a first state in which said capacitive storage means is electrically connected in parallel with the power source; and
   ii. a second state in which said capacitive storage means is electrically connected in series with the discharge lamp.

10. An electronic ballast as in claim 9 where the duty-cycle switching means operates to:
   a. electrically connect the capacitive storage means in the first state for a duty cycle $D_{parallel}$ which is dependent on the instantaneous magnitude of the power-source voltage;
   b. electrically connect the capacitive storage means in the second state for a duty cycle $D_{series}$ which is dependent on the instantaneous magnitude of the difference between the discharge-lamp voltage and the power-source voltage.

11. An electronic ballast as in claim 9 where the duty-cycle switching means operates to repeatedly electrically connect the capacitive storage means in the first state, in the second state, and in a third state in which the capacitive storage means is operatively disconnected from the power source and the discharge lamp.

12. An electronic ballast as in claim 11 where the duty-cycle switching means repeatedly electrically connects the capacitive storage means in the first, second and third states for the duty cycles $D_{parallel}$, $D_{series}$ and $D_{disconnect}$, where $D_{parallel}+D_{series}+D_{disconnect}=1$.

13. An electronic ballast for converting an alternating voltage and current of predetermined waveform and frequency, supplied by a power source, to an alternating square-wave voltage and current of said frequency for supply to a discharge lamp, said ballast comprising:
   a. a capacitive storage means;
   b. bridge switching means for alternately reversing the polarity with which the capacitive storage means is electrically connected in the ballast;
   c. duty-cycle switching means for operating at a high frequency relative to the bridge switching means to repeatedly electrically connect the capacitive storage means in at least:
      i. a first state in which said capacitive storage means is electrically connected in parallel with the discharge lamp; and
      ii. a second state in which said capacitive storage means is electrically connected in series with the power source and the discharge lamp, with the polarities of the power-source voltage and the discharge-lamp voltages opposing each other.

14. An electronic ballast as in claim 13 where the duty-cycle switching means operates to:
   a. electrically connect the capacitive storage means in the first state for a duty cycle $D_{parallel}$ which is dependent on the instantaneous magnitude of the discharge-lamp voltage;
   b. electrically connect the capacitive storage means in the second state for a duty cycle $D_{series}$ which is dependent on the instantaneous magnitude of the difference between the power-source voltage and the discharge-lamp voltage.

15. An electronic ballast as in claim 13 where the duty-cycle switching means operates to repeatedly electrically connect the capacitive storage means in the first state, in the second state, and in a third state in which the capacitive storage means is operatively disconnected from the power source and the discharge lamp.

16. An electronic ballast as in claim 15 where the duty-cycle switching means repeatedly electrically connects the capacitive storage means in the first, second and third states for the duty cycles $D_{parallel}$, $D_{series}$ and $D_{disconnect}$, where $D_{parallel}+D_{series}+D_{disconnect}=1$.

17. An electronic ballast for converting an alternating voltage and current of predetermined waveform and frequency, supplied by a power source, to an alternating square-wave voltage and current of said frequency for supply to a discharge lamp, said ballast comprising:
   a. a capacitive storage means;
   b. bridge switching means for alternately reversing the polarity with which the capacitive storage means is electrically connected in the ballast;
   c. duty-cycle switching means for operating at a high frequency relative to the bridge switching means to repeatedly electrically connect the capacitive storage means in at least:
      i. a first state in which said capacitive storage means is electrically connected in parallel with the power source or the discharge lamp; and
      ii. a second state in which said capacitive storage means is electrically connected in series with the discharge lamp or the power source.

18. An electronic ballast as in claim 17 where the duty-cycle switching means operates to repeatedly electrically connect the capacitive storage means in the first state, in the second state, and in a third state in which the capacitive storage means is operatively disconnected from the power source and the discharge lamp.

19. An electronic ballast as in claim 18 where the duty-cycle switching means repeatedly electrically connects the capacitive storage means in the first, second and third states for the duty cycles $D_{parallel}$, $D_{series}$ and $D_{disconnect}$, where $D_{parallel}+D_{series}+D_{disconnect}=1$.

20. An electronic ballast for converting an alternating voltage and current of predetermined waveform and frequency, supplied by a power source, to an alternating square-wave voltage and current of said frequency for supply to a discharge lamp, said ballast comprising:
   a. a capacitive storage means;
   b. bridge switching means for alternately reversing the polarity with which the capacitive storage means is electrically connected in the ballast;
   c. duty-cycle switching means for alternatively operating in either an up-converter mode or a down-converter mode, said duty-cycle switching means:
      i. when in an up-converter mode, operating at a high frequency relative to the bridge switching means to repeatedly electrically connect the capacitive storage means in at least:
         (1) a first state in which said capacitive storage means is electrically connected in parallel with the power source; and
         (2) a second state in which said capacitive storage means is electrically connected in series with the discharge lamp;
      ii. when in a down-converter mode, operating at a high frequency relative to the bridge switching means to repeatedly electrically connect the capacitive storage means in at least:
         (1) a third state in which said capacitive storage means is electrically connected in parallel with the discharge lamp; and
         (2) a fourth state in which said capacitive storage means is electrically connected in series with the power source.

21. An electronic ballast as in claim 20 where the duty-cycle switching means, in either the up-converter or the down-converter mode, also operates to electrically connect the capacitive storage means in a third state in which the capacitive storage means is operatively disconnected from the power source and the discharge lamp.

22. An electronic ballast as in claim 21 where the duty-cycle switching means repeatedly electrically connects the capacitive storage means in the first, second and third states for the duty cycles $D_{parallel}$, $D_{series}$ and $D_{disconnect}$, where $D_{parallel}+D_{series}+D_{disconnect}=1$.

23. An electronic ballast for converting an alternating voltage and current of predetermined waveform and frequency, supplied by a power source, to an alternating square-wave voltage and current of said frequency for supply to a discharge lamp, said ballast comprising:
   a. at least one capacitor;
   b. an arrangement of bridge switches;
   c. an arrangement of high-frequency switches;
   said bridge switches and said high-frequency switches cooperating to periodically:
      i. electrically connect the at least one capacitor in parallel with the power source;
      ii. electrically connect the at least one capacitor in series with the power source and the discharge lamp; and
      iii. regulate the average current provided to and from the at least one capacitor to effect production of said square-wave voltage and current.

24. An electronic ballast as in claim 23 where the bridge switches electrically connect the at least one capacitor in parallel with the power source during positive half cycles of the power-source voltage and electrically connect said at least one capacitor in series with the discharge lamp during negative half cycles of the power-source voltage.

25. An electronic ballast for converting an alternating voltage and current of predetermined waveform and frequency, supplied by a power source, to an alternating square-wave voltage and current of said frequency for supply to a discharge lamp, said ballast comprising:
   a. at least first and second capacitors;
   b. an arrangement of bridge switches for alternately:
      i. electrically connecting the first capacitor in parallel with the power source while electrically connecting the second capacitor in series with the discharge lamp;
      ii. electrically connecting the second capacitor in parallel with the power source while electrically connecting the first capacitor means in series with the discharge lamp; and
   c. an arrangement of duty-cycle switches for regulating the average current provided to and from the first and second capacitors to effect production of said square-wave voltage and current, said duty-cycle switches effecting net energy delivery to each of the first and second capacitors when it is electrically connected in parallel with the power source and effecting net energy delivery from each of the first and second capacitors when it is electrically connected in series with the discharge lamp.

26. An electronic ballast as in claim 25 where the arrangement of duty-cycle switches includes high-frequency switches for:
   a. during electrical connection by the bridge switches of either of the first and second capacitors in parallel with the power source, alternately completing and interrupting a current path between said capacitor and the power source, said current path being completed for a duty cycle which is dependent on the instantaneous magnitude of the power source voltage; and
   b. during electrical connection by the bridge switches of either of the first and second capacitors in series with the discharge lamp, alternately completing and interrupting a current path between said capacitor and the discharge lamp, said current path being completed for a duty cycle which is dependent on the instantaneous magnitude of the difference between the discharge-lamp voltage and the power-source voltage.

27. An electronic ballast for converting an alternating voltage and current of predetermined waveform and frequency, supplied by a power source, to an alternating square-wave voltage and current of said frequency for supply to a discharge lamp, said ballast comprising:
   a. at least one capacitor;
   b. an arrangement of bridge switches for alternately reversing the polarity with which the at least one capacitor is electrically connected in the ballast;
   c. an arrangement of duty-cycle switches for operating at a high frequency relative to the bridge switches to repeatedly electrically connect the at least one capacitor in at least:
      i. a first state in which said at least one capacitor is electrically connected in parallel with the power source; and
      ii. a second state in which said at least one capacitor is electrically connected in series with the discharge lamp.

28. An electronic ballast as in claim 27 where the arrangement of duty-cycle switches operates to:
   a. electrically connect the at least one capacitor in the first state for a duty cycle $D_{parallel}$ which is dependent on the instantaneous magnitude of the power-source voltage;
   b. electrically connect the at least one capacitor in the second state for a duty cycle $D_{series}$ which is dependent on the instantaneous magnitude of the difference between the discharge-lamp voltage and the power-source voltage.

29. An electronic ballast as in claim 27 where the arrangement of duty-cycle switches operates to repeatedly electrically connect the at least one capacitor in the first state, in the second state, and in a third state in which the at least one capacitor is operatively disconnected from the power source and the discharge lamp.

30. An electronic ballast as in claim 29 where the arrangement of duty-cycle switches repeatedly electrically connects the at least one capacitor in the first, second and third states for the duty cycles $D_{parallel}$, $D_{series}$ and $D_{disconnect}$, where $D_{parallel}+D_{series}+D_{disconnect}=1$.

31. An electronic ballast for converting an alternating voltage and current of predetermined waveform and frequency, supplied by a power source, to an alternating square-wave voltage and current of said frequency for supply to a discharge lamp, said ballast comprising:
   a. at least one capacitor;
   b. an arrangement of bridge switches for alternately reversing the polarity with which the at least one capacitor is electrically connected in the ballast;
   c. an arrangement of duty-cycle switches for operating at a high frequency relative to the bridge switches to repeatedly electrically connect the at least one capacitor in at least:
      i. a first state in which said at least one capacitor is electrically connected in parallel with the discharge lamp; and
      ii. a second state in which said at least one capacitor is electrically connected in series with the power source and the discharge lamp, with the polarities of the power-source voltage and the discharge-lamp voltages opposing each other.

32. An electronic ballast as in claim 31 where the arrangement of duty-cycle switches operates to:
   a. electrically connect the at least one capacitor in the first state for a duty cycle $D_{parallel}$ which is dependent on the instantaneous magnitude of the discharge-lamp voltage;
   b. electrically connect the at least one capacitor in the second state for a duty cycle $D_{series}$ which is dependent on the instantaneous magnitude of the difference between the power-source voltage and the discharge-lamp voltage.

33. An electronic ballast as in claim 31 where the arrangement of duty-cycle switches operates to repeatedly electrically connect the at least one capacitor in the first state, in the second state, and in a third state in which the at least one capacitor is operatively disconnected from the power source and the discharge lamp.

34. An electronic ballast as in claim 33 where the arrangement of duty-cycle switches repeatedly electrically connects the at least one capacitor in the first, second and third states for the duty cycles $D_{parallel}$, $D_{series}$ and $D_{disconnect}$, where $D_{parallel}+D_{series}+D_{disconnect}=1$.

35. An electronic ballast for converting an alternating voltage and current of predetermined waveform and frequency, supplied by a power source, to an alternating square-wave voltage and current of said frequency for supply to a discharge lamp, said ballast comprising:
   a. at least one capacitor;
   b. an arrangement of bridge switches for alternately reversing the polarity with which the at least one capacitor is electrically connected in the ballast;
   c. an arrangement of duty-cycle switches for operating at a high frequency relative to the bridge switches to repeatedly electrically connect the at least one capacitor in at least:
      i. a first state in which said at least one capacitor is electrically connected in parallel with the power source or the discharge lamp; and
      ii. a second state in which said at least one capacitor is electrically connected in series with the discharge lamp or the power source.

36. An electronic ballast as in claim 35 where the arrangement of duty-cycle switches operates to repeatedly electrically connect the at least one capacitor in the first state, in the second state, and in a third state in which the at least one capacitor is operatively disconnected from the power source and the discharge lamp.

37. An electronic ballast as in claim 36 where the arrangement of duty-cycle switches repeatedly electrically connects the at least one capacitor in the first, second and third states for the duty cycles $D_{parallel}$, $D_{series}$ and $D_{disconnect}$, where $D_{parallel}+D_{series}+D_{disconnect}=1$.

38. An electronic ballast for converting an alternating voltage and current of predetermined waveform and frequency, supplied by a power source, to an alternating square-wave voltage and current of said frequency for supply to a discharge lamp, said ballast comprising:

a. at least one capacitor;

b. an arrangement of bridge switches for alternately reversing the polarity with which the at least one capacitor is electrically connected in the ballast;

c. an arrangement of duty-cycle switches for alternatively operating in either an up-converter mode or a down-converter mode, said duty-cycle switches:

i. when in an up-converter mode, operating at a high frequency relative to the bridge switches to repeatedly electrically connect the at least one capacitor in at least:

(1) a first state in which said at least one capacitor is electrically connected in parallel with the power source; and (2) a second state in which said at least one capacitor is electrically connected in series with the discharge lamp;

ii. when in a down-converter mode, operating at a high frequency relative to the bridge switches to repeatedly electrically connect the at least one capacitor in at least:

(1) a third state in which said at least one capacitor is electrically connected in parallel with the discharge lamp; and (2) a fourth state in which said at least one capacitor is electrically connected in series with the power source.

39. An electronic ballast as in claim 38 where the arrangement of duty-cycle switches, in either the up-converter or the down-converter mode, also operates to electrically connect the at least one capacitor in a third state in which the at least one capacitor is operatively disconnected from the power source and the discharge lamp.

40. An electronic ballast as in claim 39 where the arrangement of duty-cycle switches repeatedly electrically connects the at least one capacitor in the first, second and third states for the duty cycles $D_{parallel}$, $D_{series}$ and $D_{disconnect}$, where $D_{parallel} + D_{series} + D_{disconnect} = 1$.

41. A method of operating an electronic ballast, including at least one capacitor and an arrangement of switches, for converting an alternating voltage and current of predetermined waveform and frequency, supplied by a power source, to an alternating square-wave voltage and current of said frequency for supply to a discharge lamp, said method comprising:

a. alternately electrically connecting the at least one capacitor in parallel and in series with the power source; and b. regulating the average current provided to and from the at least one capacitor to effect production of said square-wave voltage and current.

42. A method as in claim 41 where the switches electrically connect the at least one capacitor in parallel with the power source during positive half cycles of the power-source voltage and electrically connect said at least one capacitor in series with the discharge lamp during negative half cycles of the power-source voltage.

43. A method of operating an electronic ballast, including at least first and second capacitors and an arrangement of switches, for converting an alternating voltage and current of predetermined waveform and frequency, supplied by a power source, to an alternating square-wave voltage and current of said frequency for supply to a discharge lamp, said method comprising alternately:

a. electrically connecting the first capacitor in parallel with the power source while electrically connecting the second capacitor in series with the discharge lamp;

b. electrically connecting the second capacitor in parallel with the power source while electrically connecting the first capacitor means in series with the discharge lamp; and c. regulating the average current provided to and from the first and second capacitors to effect production of said square-wave voltage and current, said switches being operated to effect net energy delivery to each of the first and second capacitors when it is electrically connected in parallel with the power source and to effect net energy delivery from each of the first and second capacitors when it is electrically connected in series with the discharge lamp.

44. A method as in claim 43 where:

a. during electrical connection by the switches of either of the first and second capacitors in parallel with the power source, the switches alternately complete and interrupt a current path between said capacitor and the power source, said current path being completed for a duty cycle which is dependent on the instantaneous magnitude of the power source voltage; and b. during electrical connection by the switches of either of the first and second capacitors in series with the discharge lamp, the switches alternately complete and interrupt a current path between said capacitor and the discharge lamp, said current path being completed for a duty cycle which is dependent on the instantaneous magnitude of the difference between the discharge-lamp voltage and the power-source voltage.

45. A method of operating an electronic ballast, including at least one capacitor and an arrangement of switches, for converting an alternating voltage and current of predetermined waveform and frequency, supplied by a power source, to an alternating square-wave voltage and current of said frequency for supply to a discharge lamp, said method comprising:

a. at a first frequency, alternately reversing the polarity with which the at least one capacitor is electrically connected in the ballast; and b. at a high frequency relative to the first frequency, repeatedly electrically connecting the at least one capacitor in at least:

i. a first state in which said at least one capacitor is electrically connected in parallel with the power source; and ii. a second state in which said at least one capacitor is electrically connected in series with the discharge lamp.

46. A method as in claim 45 where the arrangement of switches operates to:

a. electrically connect the at least one capacitor in the first state for a duty cycle $D_{parallel}$ which is dependent on the instantaneous magnitude of the power-source voltage;

b. electrically connect the at least one capacitor in the second state for a duty cycle $D_{series}$ which is dependent on the instantaneous magnitude of the difference between the discharge-lamp voltage and the power-source voltage.

47. A method as in claim 45 where the arrangement of switches operates to repeatedly electrically connect the at least one capacitor in the first state, in the second state, and in a third state in which the at least one capacitor is operatively disconnected from the power source and the discharge lamp.

48. A method as in claim 47 where the arrangement of switches repeatedly electrically connects the at least one capacitor in the first, second and third states for the duty cycles $D_{parallel}$, $D_{series}$ and $D_{disconnect}$, where $D_{parallel}+D_{series}+D_{disconnect}=1$.

49. A method of operating an electronic ballast, including at least one capacitor and an arrangement of switches, for converting an alternating voltage and current of predetermined waveform and frequency, supplied by a power source, to an alternating square-wave voltage and current of said frequency for supply to a discharge lamp, said method comprising:
   a. at a first frequency, alternately reversing the polarity with which the at least one capacitor is electrically connected in the ballast; and
   b. at a high frequency relative to the first frequency, repeatedly electrically connecting the at least one capacitor in at least:
      i. a first state in which said at least one capacitor is electrically connected in parallel with the discharge lamp; and
      ii. a second state in which said at least one capacitor is electrically connected in series with the power source and the discharge lamp, with the polarities of the power-source voltage and the discharge-lamp voltages opposing each other.

50. A method as in claim 49 where the switches operates to:
   a. electrically connect the at least one capacitor in the first state for a duty cycle $D_{parallel}$ which is dependent on the instantaneous magnitude of the discharge-lamp voltage;
   b. electrically connect the at least one capacitor in the second state for a duty cycle $D_{series}$ which is dependent on the instantaneous magnitude of the difference between the power-source voltage and the discharge-lamp voltage.

51. A method as in claim 49 where the switches operates to repeatedly electrically connect the at least one capacitor in the first state, in the second state, and in a third state in which the at least one capacitor is operatively disconnected from the power source and the discharge lamp.

52. A method as in claim 51 where the switches repeatedly electrically connect the at least one capacitor in the first, second and third states for the duty cycles $D_{parallel}$, $D_{series}$ and $D_{disconnect}$, where $D_{parallel}+D_{series}+D_{disconnect}=1$.

53. A method of operating an electronic ballast, including at least one capacitor and an arrangement of switches, for converting an alternating voltage and current of predetermined waveform and frequency, supplied by a power source, to an alternating square-wave voltage and current of said frequency for supply to a discharge lamp, said method comprising:
   a. at a first frequency, alternately reversing the polarity with which the at least one capacitor is electrically connected in the ballast; and
   b. at a high frequency relative to the first frequency, repeatedly electrically connecting the at least one capacitor in at least:
      i. a first state in which said at least one capacitor is electrically connected in parallel with the power source or the discharge lamp; and
      ii. a second state in which said at least one capacitor is electrically connected in series with the discharge lamp or the power source.

54. A method as in claim 53 where the switches operate to repeatedly electrically connect the at least one capacitor in the first state, in the second state, and in a third state in which the at least one capacitor is operatively disconnected from the power source and the discharge lamp.

55. A method as in claim 54 where the switches repeatedly electrically connect the at least one capacitor in the first, second and third states for the duty cycles $D_{parallel}$, $D_{series}$ and $D_{disconnect}$, where $D_{parallel}+D_{series}+D_{disconnect}=1$.

56. A method of operating an electronic ballast, including at least one capacitor and an arrangement of switches, in either an up-converter mode or a down-converter mode, for converting an alternating voltage and current of predetermined waveform and frequency, supplied by a power source, to an alternating square-wave voltage and current of said frequency for supply to a discharge lamp, said method comprising:
   a. at a first frequency, alternately reversing the polarity with which the at least one capacitor is electrically connected in the ballast; and
   b. when in the up-converter mode, at a high frequency relative to the first frequency, repeatedly electrically connecting the at least one capacitor in at least:
      (1) a first state in which said at least one capacitor is electrically connected in parallel with the power source; and
      (2) a second state in which said at least one capacitor is electrically connected in series with the discharge lamp;
   c. when in a down-converter mode, a high frequency relative to the first frequency, repeatedly electrically connecting the at least one capacitor in at least:
      (1) a third state in which said at least one capacitor is electrically connected in parallel with the discharge lamp; and
      (2) a fourth state in which said at least one capacitor is electrically connected in series with the power source.

57. A method as in claim 56 where the switches, in either the up-converter or the down-converter mode, also operate to electrically connect the at least one capacitor in a third state in which the at least one capacitor is operatively disconnected from the power source and the discharge lamp.

58. A method as in claim 57 where the switches repeatedly electrically connects the at least one capacitor in the first, second and third states for the duty cycles $D_{parallel}$, $D_{series}$ and $D_{disconnect}$, where $D_{parallel}+D_{series}+D_{disconnect}=1$.

* * * * *